US009592710B2

(12) United States Patent
Okada et al.

(10) Patent No.: US 9,592,710 B2
(45) Date of Patent: Mar. 14, 2017

(54) WHEEL POSITION DETECTING DEVICE AND TIRE PRESSURE DETECTING APPARATUS HAVING THE SAME

(71) Applicant: DENSO CORPORATION, Kariya, Aichi-pref. (JP)

(72) Inventors: Noriaki Okada, Chiryu (JP); Nobuya Watabe, Nagoya (JP); Masashi Mori, Obu (JP); Takatoshi Sekizawa, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 413 days.

(21) Appl. No.: 14/373,472

(22) PCT Filed: Jan. 23, 2013

(86) PCT No.: PCT/JP2013/051942
§ 371 (c)(1),
(2) Date: Jul. 21, 2014

(87) PCT Pub. No.: WO2013/111910
PCT Pub. Date: Aug. 1, 2013

(65) Prior Publication Data
US 2015/0006104 A1    Jan. 1, 2015

(30) Foreign Application Priority Data

Jan. 27, 2012  (JP) .................................. 2012-15133

(51) Int. Cl.
B60C 23/04      (2006.01)
G01L 17/00      (2006.01)
(Continued)

(52) U.S. Cl.
CPC ...... *B60C 23/0489* (2013.01); *B60C 23/0416* (2013.01); *G01L 17/00* (2013.01); *G01P 3/44* (2013.01); *G01P 15/003* (2013.01)

(58) Field of Classification Search
CPC combination set(s) only.
See application file for complete search history.

(56) References Cited

U.S. PATENT DOCUMENTS 6,922,140 B2    7/2005  Hernando et al.
7,336,161 B2    2/2008  Walraet
(Continued)

FOREIGN PATENT DOCUMENTS

DE    102009059788 A1    6/2011
JP    H10048233 A        2/1998
JP    2010122023 A       6/2010

OTHER PUBLICATIONS

International Search Report and Written Opinion for PCT/JP2013/051942, mailed Apr. 11, 2013; ISA/EP.

*Primary Examiner* — Huan Tran
(74) *Attorney, Agent, or Firm* — Harness, Dickey & Pierce, P.L.C.

(57) ABSTRACT

In a wheel position detecting device, a receiver acquires gear information indicating a tooth position of a gear rotating in association with a corresponding wheel at a predetermined interval. In a wheel position detection, the receiver sets a variation allowance range based on the tooth position at a reception timing of a frame transmitted from a transmitter integrated to each wheel. When the tooth position of the gear at a subsequent reception timing of the frame is not within the variation allowance range, the receiver excludes the wheel corresponding to the gear from a candidate wheel. The receiver registers the wheel remaining last as the wheel to which the transmitter is integrated. The receiver performs the wheel position detection only when a wheel speed is (Continued)

higher than a predetermined threshold, so that the wheel position detection is performed based on an accurate tooth position.

9 Claims, 11 Drawing Sheets

(51) Int. Cl.
*G01P 3/44* (2006.01)
*G01P 15/00* (2006.01)

(56) References Cited

U.S. PATENT DOCUMENTS

| | | | |
|---|---|---|---|
| 2009/0224902 A1* | 9/2009 | Watasue | B60C 23/0416 340/447 |
| 2011/0071737 A1 | 3/2011 | Greer et al. | |
| 2012/0259507 A1 | 10/2012 | Fink | |
| 2015/0191056 A1* | 7/2015 | Mori | B60C 23/0416 73/146.5 |

* cited by examiner

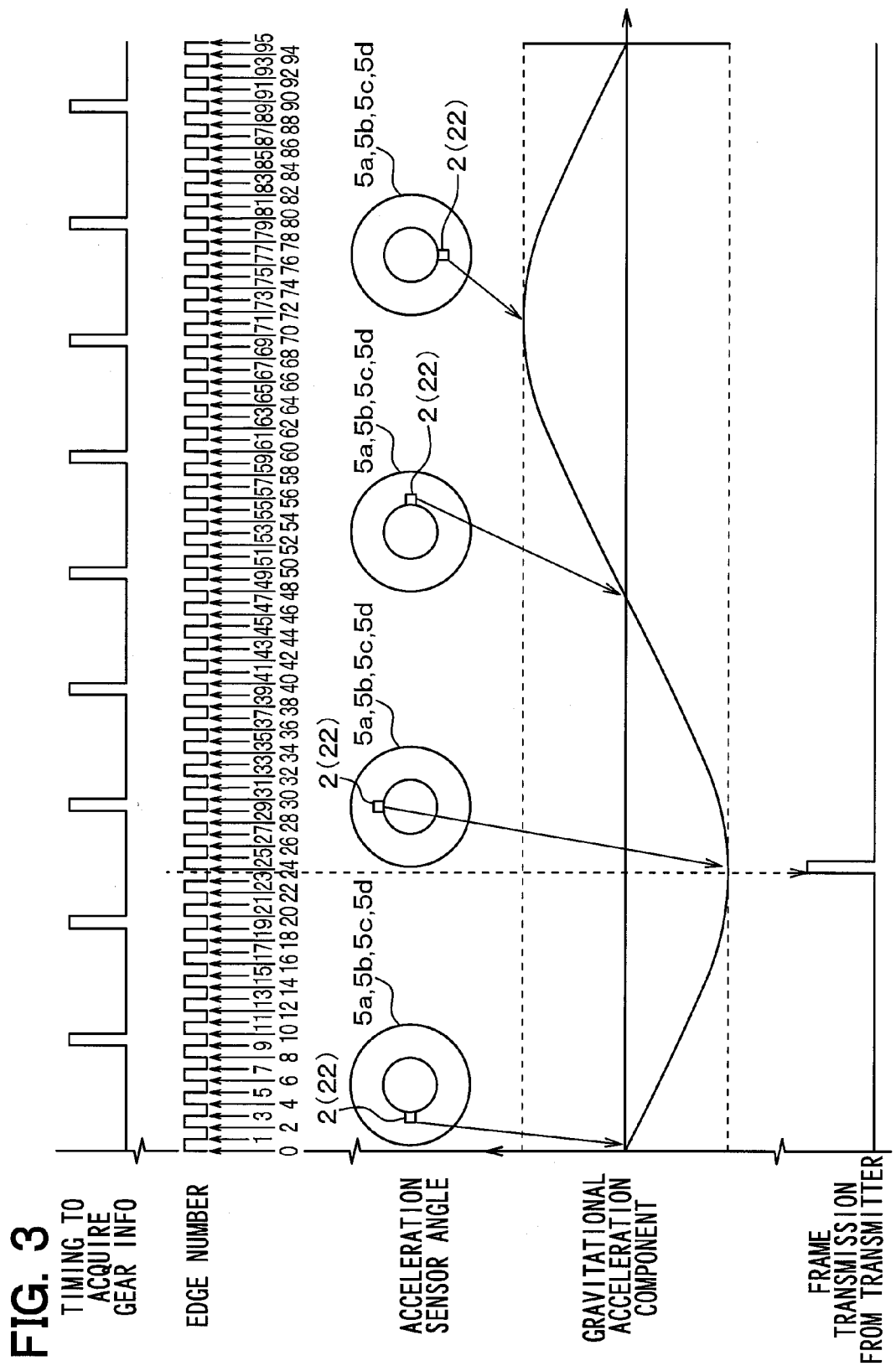

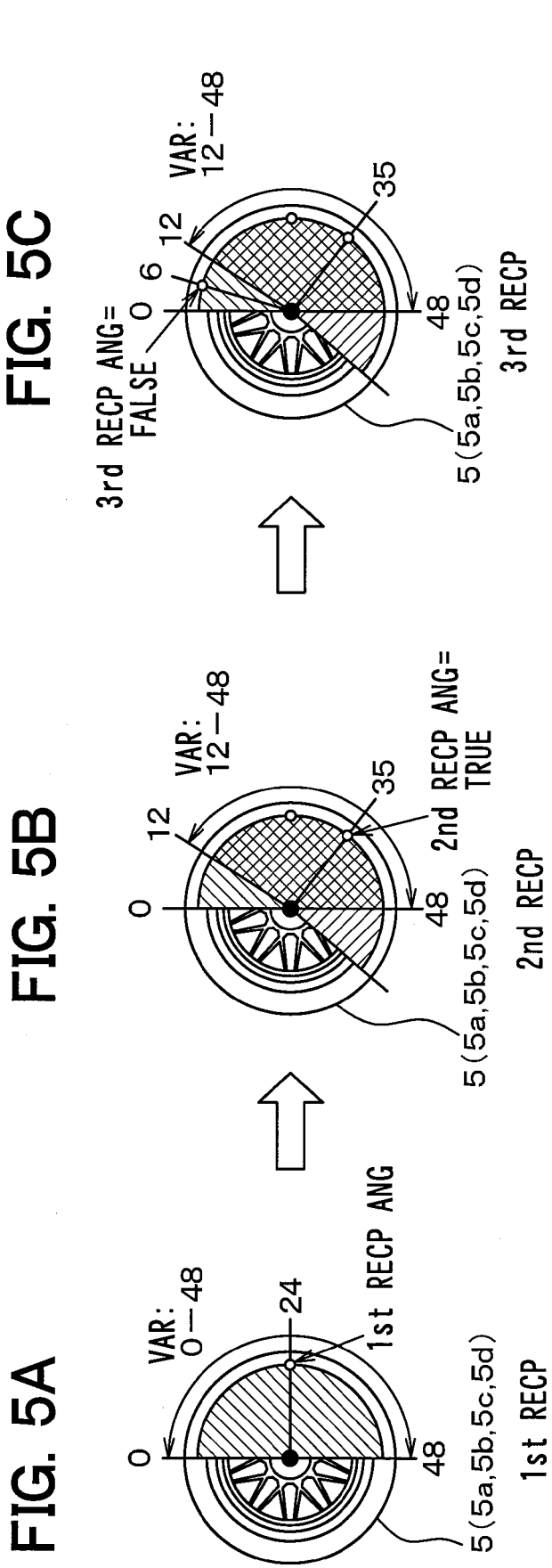

| RECP | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1 | 0.0 | 68 | 92 | 62 | 78 | — | — | — | — |
| 2 | 5.1 | 56 | 42 | 38 | 8 | TRUE | FALSE | TRUE | FALSE |
| 3 | 10.3 | 72 | 26 | 42 | 72 | TRUE | | TRUE | |
| 4 | 14.3 | 60 | 62 | 22 | 6 | TRUE | | FALSE | |

| REC | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1 | 0.0 | 38 | 68 | 30 | 50 | — | — | — | — |
| 2 | 4.1 | 2 | 78 | 80 | 46 | FALSE | TRUE | FALSE | TRUE |
| 3 | 8.3 | 42 | 74 | 14 | 28 | | TRUE | | TRUE |
| 4 | 12.4 | 88 | 78 | 52 | 22 | | TRUE | | FALSE |

| REC | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1 | 0.0 | 62 | 94 | 54 | 76 | — | — | — | — |
| 2 | 4.5 | 80 | 66 | 60 | 32 | TRUE | FALSE | TRUE | FALSE |
| 3 | 9.0 | 92 | 40 | 64 | 88 | FALSE | | TRUE | |

| REC | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1 | 0.0 | 36 | 86 | 24 | 62 | — | — | — | — |
| 2 | 4.5 | 0 | 6 | 74 | 64 | FALSE | TRUE | FALSE | TRUE |
| 3 | 8.6 | 62 | 24 | 30 | 70 | | FALSE | | TRUE |

FIG. 8A  ID1

| RECP | TIME (t) | TOOTH POSITION AT RECEPTION TIMING (0–95) | | | | WHEEL POSITION SPECIFYING LOGIC (TRUE OR FALSE) | | | | PERIOD |
|---|---|---|---|---|---|---|---|---|---|---|
| | | FL | FR | RL | RR | FL | FR | RL | RR | |
| 1 | 0.0 | 61 | 20 | 60 | 15 | – | – | – | – | |
| 2 | 4.8 | 63 | 53 | 60 | 46 | TRUE | TRUE | TRUE | TRUE | |
| 3 | 9.5 | 68 | 87 | 64 | 78 | TRUE | FALSE | TRUE | FALSE | |
| 4 | 14.3 | 57 | 11 | 52 | 95 | TRUE | | TRUE | | |
| 5 | 28.3 | 63 | 4 | 53 | 81 | TRUE | | TRUE | | |
| 6 | 32.9 | 57 | 8 | 46 | 83 | TRUE | | TRUE | | |
| 7 | 51.5 | 67 | 19 | 55 | 89 | TRUE | | TRUE | | B |
| 8 | 56.3 | 61 | 11 | 49 | 78 | TRUE | | TRUE | | |
| 9 | 61.1 | 60 | 6 | 46 | 71 | TRUE | | TRUE | | |
| 10 | 74.9 | 55 | 86 | 39 | 48 | TRUE | | TRUE | | |
| 11 | 79.6 | 66 | 94 | 49 | 53 | TRUE | | TRUE | | |
| 12 | 98.1 | 59 | 73 | 41 | 25 | TRUE | | TRUE | | |
| 13 | 102.8 | 56 | 67 | 37 | 16 | TRUE | | TRUE | | |
| 14 | 107.5 | 53 | 61 | 34 | 8 | TRUE | | TRUE | | |
| 15 | 112.3 | 64 | 68 | 44 | 13 | TRUE | | TRUE | | |
| 16 | 117.0 | 60 | 61 | 40 | 5 | TRUE | | TRUE | | |
| 17 | 121.9 | 71 | 73 | 50 | 15 | TRUE | | TRUE | | |
| 18 | 126.5 | 69 | 66 | 46 | 4 | TRUE | | TRUE | | |
| 19 | 131.0 | 60 | 58 | 36 | 90 | TRUE | | TRUE | | |
| 20 | 135.7 | 58 | 67 | 32 | 0 | TRUE | | TRUE | | |
| 21 | 140.3 | 66 | 0 | 39 | 26 | TRUE | | TRUE | | |
| 22 | 149.5 | 68 | 73 | 37 | 92 | TRUE | | TRUE | | |
| 23 | 171.0 | 71 | 48 | 37 | 60 | TRUE | | TRUE | | |
| 24 | 176.8 | 77 | 91 | 38 | 2 | TRUE | | TRUE | | |
| 25 | 181.4 | 60 | 12 | 18 | 15 | VEHICLE STOP | | | | C |
| 26 | 190.7 | 49 | 32 | 4 | 32 | TRUE | | TRUE | | D |
| 27 | 195.4 | 58 | 45 | 13 | 42 | TRUE | | FALSE | | |

SPECIFY AS FL →

| RECP | TIME (t) | TOOTH POSITION AT RECEPTION TIMING (0-95) | | | | WHEEL POSITION SPECIFYING LOGIC (TRUE OR FALSE) | | | | PERIOD |
|---|---|---|---|---|---|---|---|---|---|---|
| | | FL | FR | RL | RR | FL | FR | RL | RR | |
| 1 | 0.0 | 64 | 40 | 62 | 34 | – | – | – | – | B |
| 2 | 4.8 | 31 | 38 | 28 | 30 | TRUE | TRUE | TRUE | TRUE | |
| 3 | 9.6 | 95 | 36 | 91 | 25 | FALSE | TRUE | FALSE | TRUE | |
| 4 | 28.5 | 87 | 36 | 76 | 15 | | TRUE | | TRUE | |
| 5 | 37.7 | 80 | 40 | 69 | 16 | | TRUE | | TRUE | |
| 6 | 47.2 | 87 | 40 | 75 | 14 | | TRUE | | TRUE | |
| 7 | 51.9 | 83 | 34 | 71 | 6 | | TRUE | | TRUE | |
| 8 | 56.5 | 85 | 32 | 72 | 2 | | TRUE | | TRUE | |
| 9 | 61.1 | 89 | 33 | 75 | 1 | | TRUE | | TRUE | |
| 10 | 71.0 | 9 | 41 | 89 | 4 | | TRUE | | TRUE | |
| 11 | 75.6 | 11 | 40 | 91 | 0 | | TRUE | | TRUE | |
| 12 | 84.8 | 28 | 49 | 10 | 5 | | TRUE | | TRUE | |
| 13 | 94.6 | 20 | 34 | 2 | 82 | | TRUE | | FALSE | |

SPECIFY AS FR →

| RECP | TIME (t) | TOOTH POSITION AT RECEPTION TIMING (0-95) | | | | WHEEL POSITION SPECIFYING LOGIC (TRUE OR FALSE) | | | | PERIOD |
|---|---|---|---|---|---|---|---|---|---|---|
| | | FL | FR | RL | RR | FL | FR | RL | RR | |
| 1 | 0.0 | 28 | 83 | 27 | 78 | – | – | – | – | |
| 2 | 4.9 | 38 | 28 | 35 | 21 | TRUE | TRUE | TRUE | TRUE | |
| 3 | 9.8 | 31 | 51 | 27 | 42 | TRUE | FALSE | TRUE | FALSE | |
| 4 | 14.6 | 41 | 92 | 35 | 80 | TRUE | TRUE | TRUE | | |
| 5 | 28.6 | 46 | 85 | 37 | 65 | TRUE | TRUE | TRUE | | |
| 6 | 52.3 | 44 | 92 | 32 | 65 | TRUE | TRUE | TRUE | | |
| 7 | 57.1 | 43 | 89 | 31 | 60 | TRUE | TRUE | TRUE | | B |
| 8 | 61.8 | 41 | 84 | 28 | 52 | TRUE | TRUE | TRUE | | |
| 9 | 75.9 | 46 | 77 | 30 | 38 | TRUE | FALSE | TRUE | | |
| 10 | 80.5 | 53 | 80 | 36 | 39 | TRUE | | TRUE | | |
| 11 | 99.4 | 53 | 66 | 34 | 17 | TRUE | | TRUE | | |
| 12 | 104.1 | 57 | 67 | 38 | 16 | TRUE | | TRUE | | |
| 13 | 108.8 | 56 | 63 | 37 | 10 | TRUE | | TRUE | | |
| 14 | 113.6 | 43 | 46 | 23 | 87 | TRUE | | TRUE | | |
| 15 | 118.4 | 53 | 56 | 33 | 95 | TRUE | | TRUE | | |
| 16 | 123.3 | 50 | 51 | 29 | 88 | TRUE | | TRUE | | |
| 17 | 127.9 | 51 | 48 | 28 | 81 | TRUE | | TRUE | | |
| 18 | 132.4 | 53 | 54 | 29 | 85 | TRUE | | TRUE | | |
| 19 | 137.0 | 60 | 75 | 34 | 7 | TRUE | | TRUE | | |
| 20 | 141.6 | 63 | 4 | 36 | 30 | TRUE | | TRUE | | |
| 21 | 167.8 | 32 | 92 | 1 | 10 | – | – | VEHICLE STOP | – | C |
| 22 | 172.9 | 68 | 57 | 34 | 68 | – | – | | – | |
| 23 | 177.6 | 75 | 95 | 35 | 5 | FALSE | – | TRUE | – | D |

SPECIFY AS RL →

| RECP | TIME (t) | TOOTH POSITION AT RECEPTION TIMING (0-95) | | | WHEEL POSITION SPECIFYING LOGIC (TRUE OR FALSE) | | | PERIOD |
|---|---|---|---|---|---|---|---|---|
| | | FL | FR | RL | RR | FL | FR | RL | RR | |
| 1 | 0.0 | 86 | 40 | 85 | 36 | – | – | – | – | |
| 2 | 4.8 | 61 | 46 | 58 | 40 | TRUE | TRUE | TRUE | TRUE | |
| 3 | 9.6 | 24 | 39 | 20 | 31 | FALSE | TRUE | FALSE | TRUE | B |
| 4 | 33.1 | 6 | 53 | 92 | 32 | | TRUE | | TRUE | |
| 5 | 42.3 | 90 | 50 | 79 | 26 | | TRUE | | TRUE | |
| 6 | 51.9 | 7 | 55 | 91 | 28 | | TRUE | | TRUE | |
| 7 | 61.4 | 19 | 62 | 6 | 31 | | TRUE | | TRUE | |
| 8 | 66.0 | 20 | 59 | 6 | 26 | | TRUE | | TRUE | |
| 9 | 75.4 | 34 | 66 | 18 | 28 | | TRUE | | TRUE | |
| 10 | 80.0 | 50 | 78 | 33 | 38 | | TRUE | | TRUE | |
| 11 | 89.3 | 59 | 80 | 42 | 36 | | TRUE | | TRUE | |
| 12 | 98.6 | 62 | 76 | 43 | 27 | | TRUE | | TRUE | |
| 13 | 103.3 | 66 | 77 | 47 | 26 | | TRUE | | TRUE | |
| 14 | 108.0 | 76 | 83 | 56 | 30 | | FALSE | | TRUE | |

SPECIFY AS RR →

WHEEL POSITION DETECTING DEVICE AND TIRE PRESSURE DETECTING APPARATUS HAVING THE SAME

CROSS REFERENCE TO RELATED APPLICATIONS

This application is a U.S. National Phase Application under 35 U.S.C. 371 of International Application No. PCT/JP2013/051942 filed on Jan. 23, 2013 and published in English as WO 2013/111910 A1 on Aug. 1, 2013. This application is based on Japanese Patent Application No. 2012-15133 filed on Jan. 27, 2012. The entire disclosures of all of the above applications are incorporated herein by reference.

TECHNICAL FIELD

The present disclosure relates to a wheel position detecting device that detects a position of a subject wheel in a vehicle, and a tire pressure detecting apparatus having the wheel position detecting device.

BACKGROUND ART

For example, a wheel position detecting device automatically detects a position of a subject wheel in a vehicle. Also, it has been known to use a wheel position detecting device in a tire pressure detecting apparatus for detecting a tire pressure of a wheel. As an example of the tire pressure detecting apparatus, a direct-type tire pressure detecting apparatus has been known.

In the direct-type tire pressure detecting apparatus, a transmitter is directly fixed to each of wheels with a tire. The transmitter is provided with a sensor, such as a pressure sensor. A vehicle body is equipped with an antenna and a receiver. When the transmitter transmits a detection signal of the sensor, the receiver receives the detection signal through the antenna, and detects the tire pressure of the wheel based on the detection signal.

In such a direct-type tire pressure detecting apparatus, data transmitted from the transmitter includes individual identification (ID) information for identifying whether the transmitted data is associated with a subject vehicle to which the tire pressure detecting apparatus is equipped, and for identifying the wheel to which the transmitter transmitting the data is fixed.

To specify the position of the transmitter based on the identification information of the transmitted data, the receiver needs to store beforehand a relationship between the identification information of each transmitter and the position of each wheel. When the positions of the wheels are changed by a tire rotation, it is necessary to register the relationship between the identification information of each transmitter and the position of each wheel again. For example, a patent literature 1 describes a tire pressure monitoring apparatus and a tire pressure monitoring method for automatically registering the relationship between the identification information of each transmitter and the position of each wheel.

In the tire pressure monitoring apparatus of the patent literature 1, a rotational position of each wheel is detected based on an acceleration detection signal of an acceleration sensor of the transmitter. Also, a rotational position of each wheel is detected in a vehicle body when a radio signal is transmitted from the transmitter. The position of the wheel is specified by monitoring a change in a relative angle between the rotational position detected by the transmitter and the rotational position of the wheel detected in the vehicle body.

Namely, the change of the relative angle between the rotational position of the wheel detected in the wheel and the rotational position of the wheel detected in the vehicle body is monitored based on a deviation of predetermined number of data. The position of the wheel is specified by determining whether a variation of the change of the relative angle relative to an initial value is over an acceptable value.

In particular, a wheel speed sensor is provided for each of the wheels. A tooth number of a gear (rotor) is calculated based on a wheel speed pulse outputted from the wheel speed sensor. The wheel position is specified based on a relative angle between the rotational position detected by the transmitter based on the acceleration detection signal of the acceleration sensor and a rotational angle indicated by the tooth number of the gear calculated from the wheel speed pulse.

However, the wheel speed pulse outputted from the wheel speed sensor is likely to largely vary in a low speed region, and it is difficult to properly count the tooth number in the low speed region. Therefore, although the wheel is actually rotating, if the tooth number calculated and the rotational position of the wheel detected based on the acceleration detection signal of the acceleration sensor are largely varied relative to each other, it is difficult to properly specify the position of the wheel.

Also, in the method of the patent literature 1, the wheel position is specified by determining whether a variation is within an allowance range defined by a predetermined allowance value with respect to an initial value. Therefore, in a period where the variation is within the allowance range, the wheel position cannot be specified. Also, since the wheel position is specified based on a standard deviation, a certain amount of data is required. Therefore, the wheel position cannot be specified until the certain amount of data is made. Therefore, it takes time to specify the wheel position.

Cited Literature

Patent literature 1: Japanese Patent Application Publication No. JP2010-122023A

SUMMARY

It is an object of the present disclosure to provide a wheel position detecting device capable of accurately specifying a position of a wheel, and to provide a tire pressure detecting apparatus having the wheel position detecting device.

According to an aspect of the present disclosure, a wheel position detecting device includes a transmitter, a receiver, and a wheel speed sensor. The transmitter is integrated to each of wheels of a vehicle. The transmitter includes a first control unit generating and transmitting a frame that includes identification information specific to the transmitter. The receiver is integrated to a vehicle body. The receiver includes an antenna and a second control unit. The second control unit receives the frame transmitted from the transmitter through the antenna. The second control unit performs a wheel position detection to specify which of the plurality of wheels the transmitter transmitting the frame is integrated to and to store a relationship between the identification information of the transmitter and the wheel to which the transmitter is integrated.

The transmitter further includes an acceleration sensor that outputs a detection signal according to an acceleration containing a gravitational acceleration component that varies with rotation of the wheel to which the transmitter is integrated. The first control unit detects an angular position of the transmitter relative to a reference position, based on the gravitational acceleration component provided by the detection signal of the acceleration sensor. The reference position is set at any position in a circumferential direction of the wheel. The first control unit transmits the frame when the transmitter is at a transmission angular position.

The wheel speed sensor is provided for each of the wheels to detect a tooth of a gear that rotates in association with a corresponding wheel. The gear includes conductive portions as teeth and intermediate portions between the conductive potions. The intermediate portions have a magnetic resistance different from the conductive portions. The second control unit acquires gear information indicating a tooth position of the gear based on a detection signal of the wheel speed sensor.

In the wheel position detection, the second control unit sets a variation allowance range based on the tooth position at a reception timing of the frame and determines whether the tooth position at a subsequent reception timing of the frame is within the set variation allowance range. When the tooth position of the gear at the subsequent reception timing is not within the variation allowance range, the second control unit excludes the wheel corresponding to the gear from a candidate wheel to which the transmitter is integrated until one wheel remains, and registers a remaining wheel as the wheel to which the transmitter is integrated. The second control unit prevents the wheel position detection when a wheel speed detected based on a detection signal of the wheel speed sensor is equal to or lower than a predetermined threshold, and performs the wheel position detection only when the wheel speed is higher than the predetermined threshold.

In the wheel position detecting device described above, the wheel position detection is not performed in a low speed region where the wheel speed is equal to or lower than the predetermined threshold. Therefore, it is less likely that the wheel position detection will be performed based on an inaccurate tooth position. Namely, since the wheel position detection is performed only when the wheel speed is higher than the predetermined threshold, the wheel position is accurately specified.

BRIEF DESCRIPTION OF THE DRAWINGS

The above and other objects, features and advantages of the present disclosure will become more apparent from the following detailed description made with reference to the accompanying drawings. In the drawings:

FIG. 3 is a time chart for explaining a wheel position detection performed by the wheel position detecting device according to the first embodiment;

FIGS. 5A to 5C are schematic diagrams for explaining a wheel position specifying logic performed by the wheel position detecting device according to the first embodiment;

FIG. 6A is a diagram illustrating a wheel position evaluation result of a first frame including first identification information according to the first embodiment;

FIG. 6B is a diagram illustrating a wheel position evaluation result of a second frame including second identification information according to the first embodiment;

FIG. 6C is a diagram illustrating a wheel position evaluation result of a third frame including third identification information according to the first embodiment;

FIG. 6D is a diagram illustrating a wheel position evaluation result of a fourth frame including fourth identification information according to the first embodiment;

FIG. 8A is a diagram illustrating a wheel position evaluation result of the first frame in a case where the wheel speed varies in a manner shown in FIG. 7, according to the first embodiment;

FIG. 8B is a diagram illustrating a wheel position evaluation result of the second frame in a case where the wheel speed varies in a manner shown in FIG. 7, according to the first embodiment;

FIG. 8C is a diagram illustrating a wheel position evaluation result of the third frame in a case where the wheel speed varies in a manner shown in FIG. 7, according to the first embodiment; and FIG. 8D is a diagram illustrating a wheel position evaluation result of the fourth frame in a case where the wheel speed varies in a manner shown in FIG. 7, according to the first embodiment.

DESCRIPTION OF EMBODIMENTS

Figure 1:
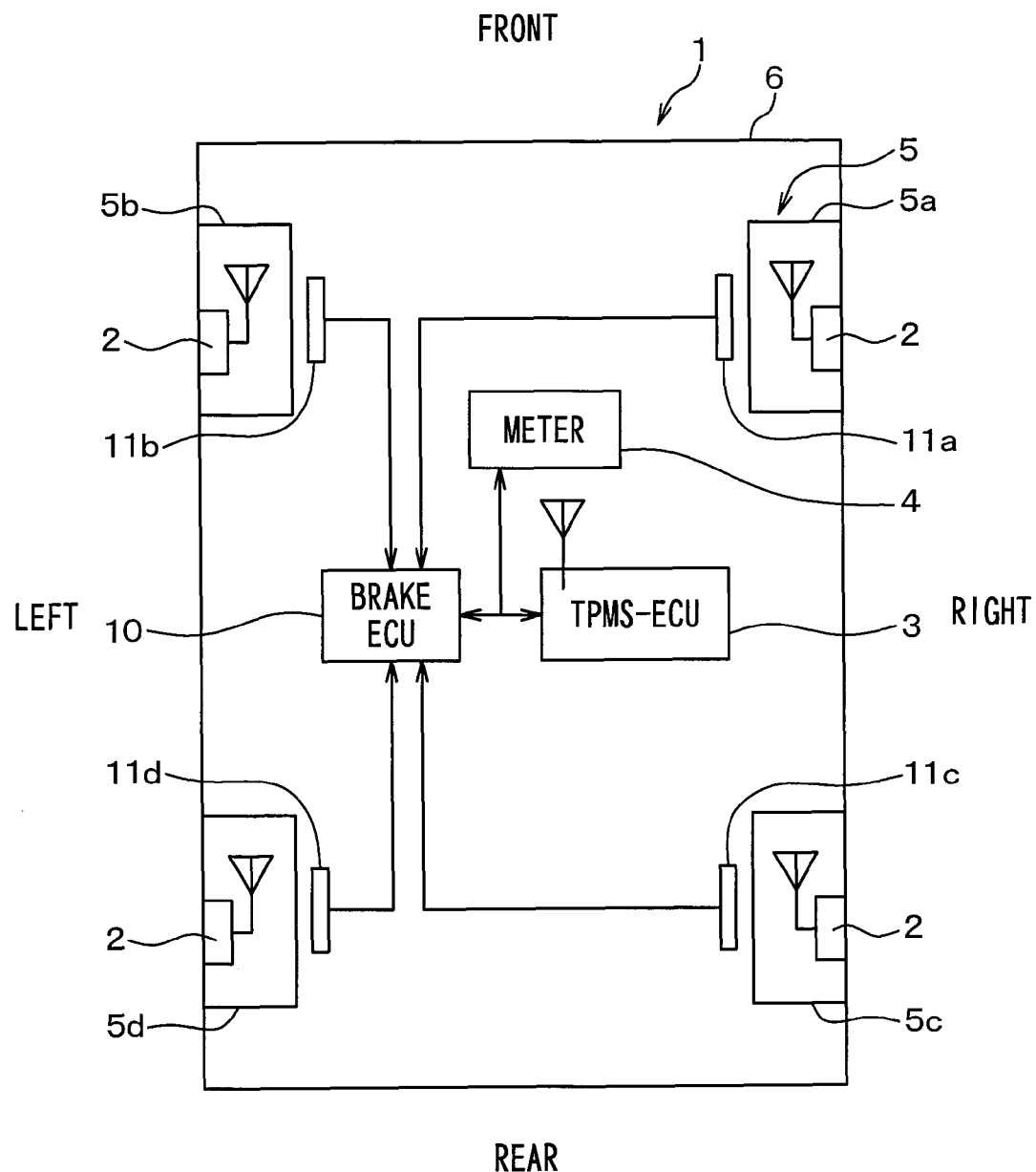
FIG. 1 is a schematic diagram for illustrating an overall structure of a wheel position detecting device and an overall structure of a tire pressure detecting apparatus employing the wheel position detecting device, according to a first embodiment of the present disclosure.

Hereinafter, embodiments of the present disclosure will be described with reference to the drawings. Like parts will be designated with like reference numerals throughout the embodiments.

First Embodiment

A first embodiment will be described with reference to FIGS. 1 to 8D.

FIG. 1 is a schematic diagram illustrating an overall structure of a wheel position detecting device and an overall structure of a tire pressure detecting apparatus in a vehicle 1. In FIG. 1, an upward direction corresponds to a frontward direction of the vehicle 1, and a downward direction corresponds to a rearward direction of the vehicle 1. The tire pressure detecting apparatus according to the present embodiment will be described with reference to FIG. 1.

The tire pressure detecting apparatus is equipped to the vehicle 1. The tire pressure detecting apparatus includes a transmitter 2, a tire pressure monitoring system electronic control unit (hereinafter referred to as the TPMS-ECU) 3, and a meter 4. The TPMS-ECU 3 serves as a receiver.

The wheel position detecting device uses the transmitter 2 and the TPMS-ECU 3, which are included in the tire pressure detecting apparatus. The wheel position detecting device specifies a position of a wheel 5 (5a-5d) by acquiring gear information from a brake electronic control unit (hereinafter referred to as the brake ECU) 10. The gear information is provided based on a detection signal of each of wheel speed sensors 11a-11d, which are provided for the wheels 5a-5d, respectively.

The transmitter 2 is integrated to each of the wheels 5a-5d. The transmitter 2 detects a tire pressure, such as a tire air pressure, of the corresponding wheel 5a-5d. The transmitter 2 stores a result of detection of the tire pressure, as information regarding a tire pressure, in a frame, and transmits the frame.

The TPMS-ECU 3 is integrated to a body 6 of the vehicle 1. The TPMS-ECU 3 receives the frame transmitted from the transmitter 2. Further, the TPMS-ECU 3 performs a wheel position detection and a tire pressure detection by executing various processes and computations based on data stored in the frame.

Figure 2A:
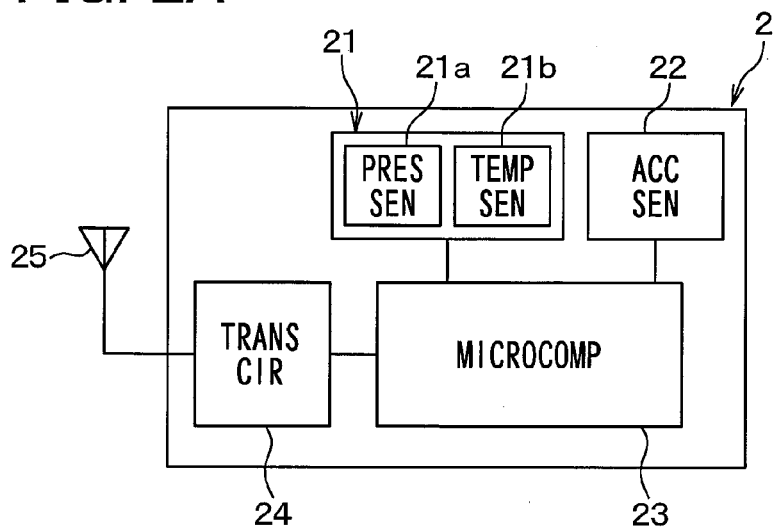
FIG. 2A is a schematic block diagram of a transmitter of the wheel position detecting device according to the first embodiment.
Figure 2B:
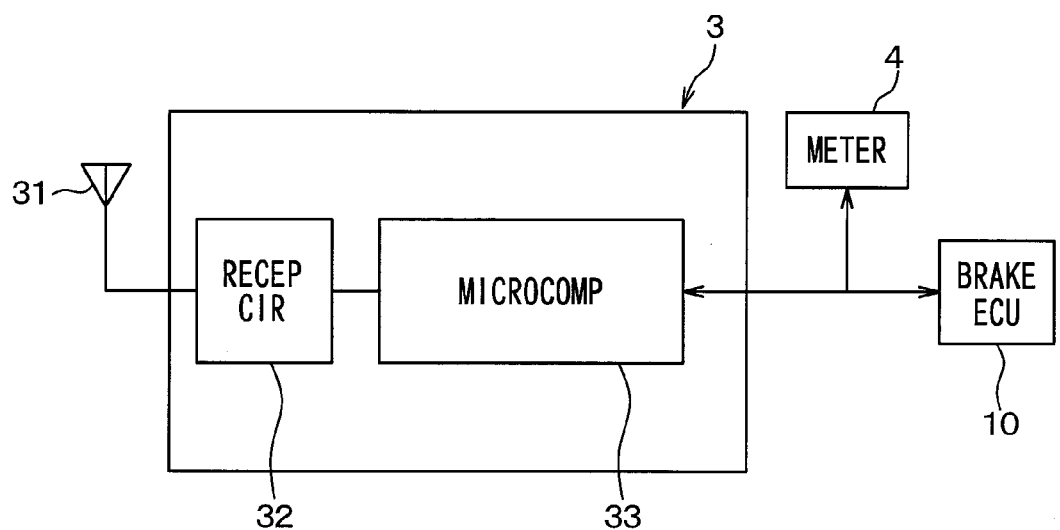
FIG. 2B is a schematic block diagram of a receiver of the wheel position detecting device according to the first embodiment.

For example, the transmitter 2 generates the frame by a frequency shift keying (FSK). The TPMS-ECU 3 demodulates the frame to read data in the frame, and performs the wheel position detection and the tire pressure detection based on the data read. FIG. 2A is a schematic block diagram of the transmitter 2, and FIG. 2B is a schematic block diagram of the TPMS-ECU 3.

As shown in FIG. 2A, the transmitter 2 includes a sensing unit 21, an acceleration sensor 22, a microcomputer 23, a transmission circuit 24 and a transmitting antenna 25. The sensing unit 21, the acceleration sensor 22, the microcomputer 23, the transmission circuit 24 and the transmitting antenna 25 are driven by electric power supplied from a battery (not shown).

The sensing unit 21 includes a pressure sensor 21a and a temperature sensor 21b. The pressure sensor 21a is, for example, a diaphragm-type pressure sensor. The sensing unit 21 outputs a detection signal according to the tire pressure, and a detection signal according to a temperature.

The acceleration sensor 22 is used for detecting its position within the corresponding wheel 5a-5d to which the transmitter 2 is integrated. That is, the acceleration sensor 22 is used for detecting a position of the transmitter 2. Also, the acceleration sensor 22 is used for detecting a speed of the vehicle 1. The acceleration sensor 22 outputs a detection signal according to accelerations in both radial directions of the corresponding wheel 5a-5d, that is, accelerations in both directions perpendicular to a circumferential direction of the corresponding wheel 5a-5d.

The microcomputer 23 may be a well-known type microcomputer. The microcomputer 23 includes a control unit (first control unit) and the like.

The microcomputer 23 performs a predetermined process in accordance with a program stored in a memory of the control unit. The memory of the control unit has individual identification information including transmitter identification information and vehicle identification information. The transmitter identification information is specific to the subject transmitter 2 for identifying the subject transmitter 2. The vehicle identification information is specific to the subject vehicle 1 to identify the subject vehicle 1.

The microcomputer 23 receives the detection signal indicating the tire pressure from the sensing unit 21, and processes the detection signal to generate the information regarding the tire pressure. Further, the microcomputer 23 stores the information regarding the tire pressure as well as the identification information of the subject transmitter 2 in the frame.

Also, the microcomputer 23 monitors the detection signal from the acceleration sensor 22. The microcomputer 23 detects the position of the subject transmitter 2 within the corresponding wheel 5a-5d, and detects the vehicle speed based on the detection signal from the acceleration sensor 22.

When the microcomputer 23 generates the frame, the microcomputer 23 transmits the frame (data) toward the TPMS-ECU 3 through the transmission circuit 24 and the transmission antenna 25, based on detection results of the position of the subject transmitter 2 and the vehicle speed.

In particular, the microcomputer 23 begins to transmit the frame when the vehicle 1 is traveling. Further, the microcomputer 23 transmits the frame each time the acceleration sensor 22 is at a predetermined angular position relative to a reference position, based on the detection signal of the acceleration sensor 22. The microcomputer 23 determines whether the vehicle 1 is traveling, based on the detection result of the vehicle speed. Also, the microcomputer 23 determines the angular position of the acceleration sensor 22 based on the detection result of the position of the transmitter 2, which is obtained based on the detection signal of the acceleration sensor 22.

Namely, the microcomputer 23 detects the vehicle speed using the detection signal of the acceleration sensor 22, and determines that the vehicle is traveling when the vehicle speed is equal to or greater than a predetermined speed, such as 3 km/h or more. The output of the acceleration sensor 22 contains an acceleration (centrifugal acceleration) based on a centrifugal force. The vehicle speed is calculated by integrating the centrifugal accelerations and multiplying a coefficient. Therefore, the microcomputer 23 calculates the centrifugal acceleration by removing a gravitational acceleration component from the output of the acceleration sensor 22, and calculates the vehicle speed based on the calculated centrifugal acceleration.

The acceleration sensor 22 outputs the detection signal according to rotation of the corresponding wheel 5a-5d. Therefore, when the vehicle 1 is traveling, the detection signal of the acceleration sensor 22 contains the gravitational acceleration. As such, the detection signal has an amplitude according to the rotation of the corresponding wheel 5a-5d.

For example, the amplitude of the detection signal has a maximum negative value when the transmitter 2 is located right above a center axis of the corresponding wheel 5a-5d (wheel center axis), and has a maximum positive value when the transmitter 2 is located right under the wheel center axis. Further, the amplitude of the detection signal has a value of zero when the transmitter 2 is at the same level as the wheel center axis.

Therefore, the angular position of the acceleration sensor 22 can be detected based on the amplitude. For example, a position right above the wheel center axis is defined as reference position, such as a zero degree position. The angular position of the acceleration sensor 22 is defined relative to the reference position. The reference position may be any position on a circumferential direction of the wheel 5a-5d.

The transmitter 2 begins to transmit the frame when the vehicle speed reaches a predetermined speed or when the acceleration sensor 22 is at the predetermined angular position after the vehicle speed reaches the predetermined speed. Further, the transmitter 2 may transmit the frame each time the acceleration sensor 22 reaches the angular position same as the angular position when the frame is transmitted first time, as a transmission timing. Namely, the transmitter 2 repeatedly transmits the frame.

With regard to the transmission timing, the frame may be transmitted each time the acceleration sensor 22 reaches the angular position same as the angular position when the frame is transmitted first time. However, it may not be always necessary to transmit the frame each time the acceleration sensor 22 reaches the same angular position. Considering a battery life, the transmitter 2 may transmit the frame at a predetermined interval, such as every 15 seconds.

The transmission circuit 24 serves as an output unit that receives the frame provided from the microcomputer 23 and transmits the frame toward the TPMS-ECU 3 through the transmission antenna 25. For example, the frame is transmitted through an RF band radio wave.

The transmitter 2 is, for example, fixed to an air injection valve of the corresponding wheel 5a-5d such that the sensing unit 21 exposes inside of the tire. The pressure sensor 21a of the transmitter 2 detects the tire pressure. As described above, when the vehicle speed exceeds the predetermined speed, the transmitter 2 transmits the frame through the transmission antenna 25 each time the acceleration sensor 22 is at the predetermined angular position.

Thereafter, it may be possible that the transmitter 2 continuously transmit the frame each time the acceleration sensor 22 is at the predetermined angular position. However, considering the battery life, it is preferable to increase a transmission interval. Therefore, when a predetermined time period necessary for specifying the wheel position has elapsed, the transmitter 2 may be switched from a wheel position specifying mode to a regular transmission mode.

In the regular transmission mode, the transmitter 2 regularly transmits the frame toward the TPMS-ECU 3 at a constant interval, such as every one minute, which is longer than the transmission interval in the wheel position specifying mode. In this case, for example, it may be possible to differentiate the transmission timing of the frame between the transmitters 2 by setting a random delay for each transmitter 2. In such a case, interference of the radio waves from the plural transmitters 2 will be reduced, so that the frames will be properly received by the TPMS-ECU 3.

As shown in FIG. 2B, the TPMS-ECU 3 includes a reception antenna 31, a reception circuit 32, and a microcomputer 33. The TPMS-ECU 3 acquires the gear information from the brake ECU 10 through an in-vehicle local area network (LAN), such as a controller area network (CAN).

In the vehicle 1, gears 12a-12d are disposed to rotate in association with the wheels 5a-5d, respectively. The TPMS-ECU 3 obtains a tooth position of each gear 12a-12d, which is represented by an edge number or a tooth number, based on the gear information.

The reception antenna 31 is provided to receive the frame transmitted from each transmitter 2. The reception antenna 31 is fixed to the vehicle body 6. The reception antenna 31 may be an internal antenna disposed inside of a body of the TPMS-ECU 3. Alternatively, the reception antenna 31 may be an external antenna disposed outside of the body of the TPMS-ECU 3 and connected to the body of the TPMS-ECU 3 through a wire.

The reception circuit 32 serves as an input section that receives the frame transmitted from each transmitter 2 through the reception antenna 31, and sends the frame to the microcomputer 33. Namely, when the reception circuit 32 receives a signal (frame) through the reception antenna 31, the reception circuit 32 transmits the received signal to the microcomputer 33.

The microcomputer 33 corresponds to a second control unit. The microcomputer 33 performs a wheel position detection process in accordance with a program stored in a memory of the microcomputer 33. In particular, the microcomputer 33 performs the wheel position detection based on a relationship between information acquired from the brake ECU 10 and a reception timing receiving the frame transmitted from each transmitter 2. The microcomputer 33 acquires the gear information, in addition to wheel speed information of each of the wheels 5a-5d, from the brake ECU 10 at a predetermined time interval, such as every 10 milliseconds.

The gear information indicates the tooth position of each gear 12a-12d rotating in association with the corresponding wheel 5a-5d. The tooth position of the gear 12a-12d is detected using the wheel speed sensor 11a-11d disposed to correspond to the gear 12a-12d.

For example, the wheel speed sensor 11a-11d is provided by an electromagnetic pick-up sensor disposed to oppose teeth of the corresponding gear 12a-12d. A detection signal outputted from the wheel speed sensor 11a-11d changes in accordance with passage of the teeth of the gear 12a-12d. The wheel speed sensor 11a-11d outputs a rectangular pulse wave corresponding to the teeth, as the detection signal. Rising edges and falling edges of the rectangular pulse wave indicate the passage of edges of the teeth of the gear 12a-12d.

The brake ECU 10 detects the edge number, that is, counts the number of edges being passed through the wheel speed sensor 11a-11d based on the number of rising edges and falling edges of the detection signal of the wheel speed sensor 11a-11d. The brake ECU 10 provides a current edge number to the microcomputer 33 at a predetermined interval, as the gear information. Therefore, the microcomputer 33 can determine which tooth of the gear 12a-12d passes through the wheel speed sensor 11a-11d at a timing.

The edge number is reset each time the gear 12a-12d rotates one revolution. For example, in a case of gear having 48 teeth, the number of edges is 96. In this case, the edge number is counted from 0 to 95. When the edge number counted reaches 95, the edge number returns to 0, and is counted again from zero.

In the example described above, the edge number is provided from the brake ECU 10 to the microcomputer 33 as the gear information. As another example, a tooth number, that is, the number of teeth counted may be provided from the brake ECU 10 to the microcomputer 33 as the gear information. As further another example, the number of edges or the number of teeth, which has passed through the wheel speed sensor 11a-11d in a predetermined period, may be provided to the microcomputer 33, and the microcomputer 33 may add the number of edges or the number of teeth provided to a previous edge number or tooth number, to detect the edge number or the tooth number. That is, a way of detecting the edge number or the tooth number may not be limited to a specific way as long as the microcomputer 33 ultimately obtains the edge number or the tooth number as the gear information.

The brake ECU 10 resets the edge number (or the tooth number) when the power supply is turned off. The brake ECU 10 begins to count the edge number (or the tooth number) again when the power supply is turned on or when the vehicle speed reaches the predetermined speed after the power supply is turned on. In this way, even if the edge number (or the tooth number) is reset every time the power supply is turned off, the same tooth is indicated with the same edge number (or the same tooth number) during the electric power being off.

When the microcomputer 33 receives the frame transmitted from each transmitter 2, the microcomputer 33 measures the reception timing of the frame, and performs the wheel position detection based on the edge number (or the tooth number) at the reception timing of the frame among the edge numbers (or the tooth numbers) acquired. Therefore, the wheel position detection to specify which of the wheels 5a-5d each transmitter 2 is integrated to can be performed. The wheel position detection will be described later more in detail.

The microcomputer 33 stores a relationship between the identification information of each transmitter 2 and the position of each wheel 5a-5d to which the transmitter 2 is integrated, based on the result of the wheel position detection. Thereafter, the microcomputer 33 detects the tire pressure of each wheel 5a-5d based on the identification information and the information on the tire pressure, which are stored in the frame transmitted from each transmitter 2. Further, the microcomputer 33 outputs an electric signal according to the tire pressure to the meter 4 through the in-vehicle LAN, such as the CAN.

For example, the microcomputer 33 detects a decrease in pressure of the tire by comparing the detected tire pressure to a predetermined threshold. When the microcomputer 33 detects the decrease in pressure of the tire, the microcomputer 33 outputs a signal indicating the decrease in pressure of the tire to the meter 4. Namely, the microcomputer 33 can notify the meter 4 of the decrease of the tire pressure of any of the wheels 5a-5d.

The meter 4 serves as a warning section. As shown in FIG. 1, the meter 4 is disposed at a position which can be seen by a driver. For example, the meter 4 is provided by a meter display and the like disposed within an instrument panel of the vehicle 1. For example, when the meter 4 receives the signal indicating the decrease in tire pressure from the microcomputer 33 of the TPMS-ECU 3, the meter 4 displays the decrease in tire pressure with the indication of the wheel 5a-5d. Namely, the meter 4 notifies the driver of the decrease in tire pressure of a certain wheel 5a-5d.

Next, an operation of the tire pressure detecting apparatus will be described. In the following description, the wheel position detection and the tire pressure detection, which are performed by the tire pressure detecting apparatus, will be explained separately.

Figure 4:
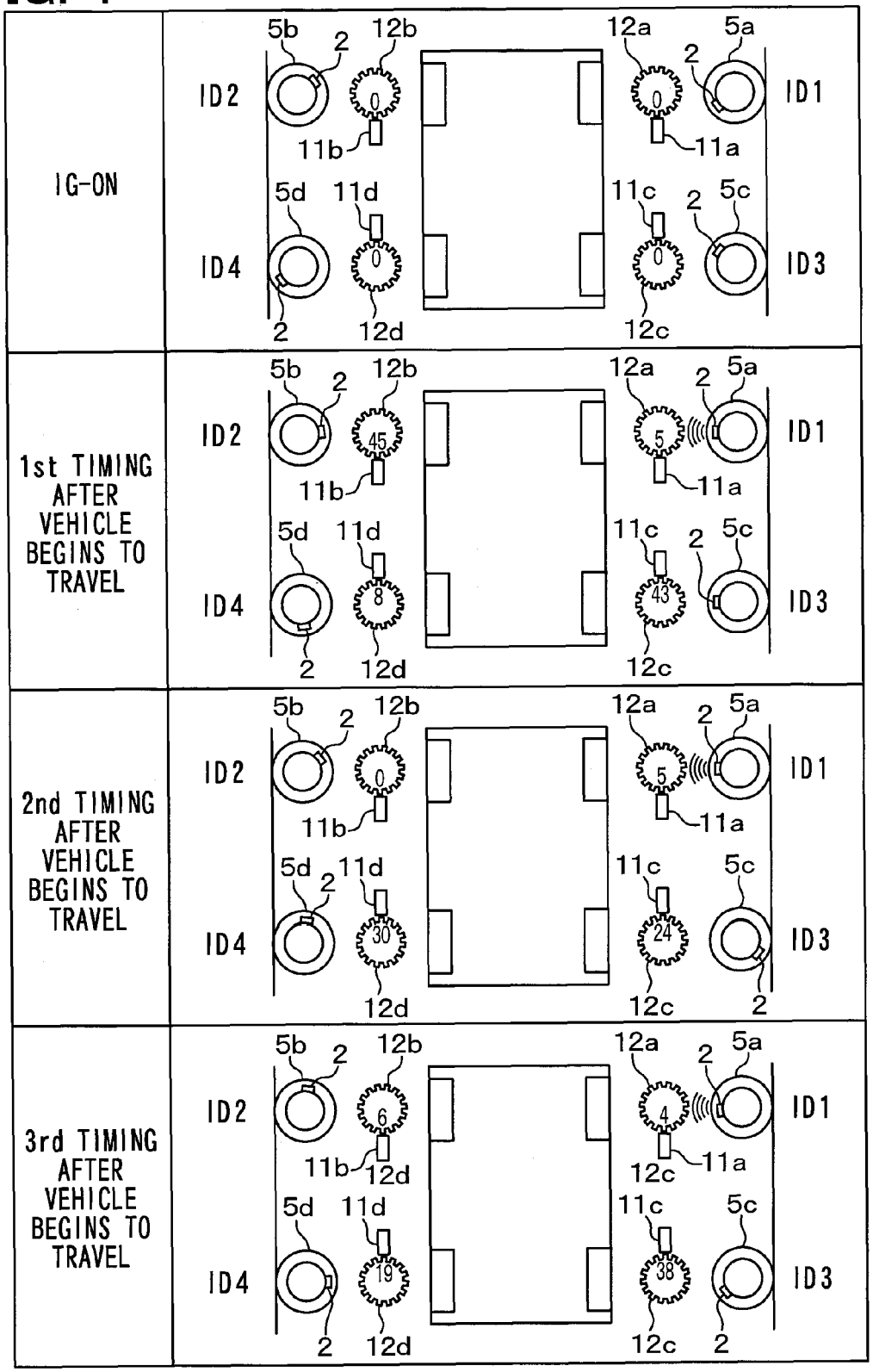
FIG. 4 is a schematic diagram for illustrating a change of gear information according to the first embodiment.

First, the wheel position detection will be described. FIG. 3 is a time chart for explaining the wheel position detection. FIG. 4 is a diagram illustrating an image of a change of the gear information after an ignition switch is turned on and the vehicle 1 begins to travel. For example, FIG. 4 illustrates the gear information at each timing, such as when the ignition switch is turned on and at first to third timings after the vehicle 1 begins to travel. FIGS. 5A to 5C are schematic diagrams for explaining a wheel position specifying logic. FIGS. 6A to 6D are charts illustrating wheel position evaluation results with regard to first to fourth frames transmitted from the transmitters 2. The first frame includes first identification information ID1 of a first transmitter 2. The second frame includes second identification information ID2 of a second transmitter 2. The third frame includes third identification information ID3 of a third transmitter 2. The fourth frame includes fourth identification information ID4 of a fourth transmitter 2. The method of the wheel position detection will be described in detail with reference to FIGS. 3 to 6D.

In the transmitter 2, the microcomputer 23 is supplied with electric power from the battery. The microcomputer 23 monitors the detection signal of the acceleration sensor 22 at a predetermined sampling interval to detect the vehicle speed and the angular position of the acceleration sensor 22 within the corresponding wheel 5a-5d.

After the vehicle speed reaches a predetermined speed, the microcomputer 23 transmits the frame each time the acceleration sensor 22 is at a predetermined angular position. For example, the transmitter 2 beings to transmit the frame when the vehicle speed reaches the predetermined speed, or when the acceleration sensor 22 reaches a predetermined angular position after the vehicle speed reaches the predetermined speed. Thereafter, the transmitter 2 transmits the frame each time the acceleration sensor 22 is at the angular position same as the angular position when the frame is transmitted first time, as a transmission angular position.

The gravitational acceleration component of the detection signal outputted from the acceleration sensor 22 has a sine curve, as shown in FIG. 3. The angular position of the acceleration sensor 22 is detected based on the sine curve. Therefore, the frame is transmitted each time the acceleration sensor 22 reaches the same angular position based on the sine curve.

The TPMS-ECU 3 acquires the gear information of the wheel speed sensor 11a-11d provided in association with the corresponding wheel 5a-5d, at a predetermined interval, such as every 10 milliseconds, from the brake ECU 10. The TPMS-ECU 3 measures the reception timing of the frame transmitted from each transmitter 2, and detects the edge number (or the tooth number) of the gears 12a-12d at the reception timing of the frame among the edge numbers (or the tooth numbers) acquired.

In this case, it is not always true that the reception timing of the frame transmitted from each transmitter 2 and the timing of acquiring the gear information from the brake ECU 10 coincide with each other. For example, the edge number (or the tooth number) of the gear information acquired at a timing that is the closest to the reception timing of the frame, that is, the edge number (or the tooth number) of the gear information acquired at a timing immediately before or immediately after the reception timing of the frame may be used as the edge number (or the tooth number) at the reception timing of the frame.

As another example, the edge number (or the tooth number) at the reception timing of the frame may be calculated using the edge number (or the tooth number) indicated by the gear information acquired at the timing immediately before or immediately after the reception timing of the frame. For example, an intermediate number between the edge number (or the tooth number) of the gear information acquired at the timing immediately before the reception timing of the frame and the edge number (or the tooth number) of the gear information acquired at the timing immediately after the reception timing of the frame may be used as the edge number (or the tooth number) of the reception timing of the frame.

The TPMS-ECU 3 obtains the edge number (or the tooth number) at the reception timing of the frame each time the TPMS-ECU 3 receives the frame. The TPMS-ECU 3 performs the wheel position detection based on the obtained edge numbers (or tooth numbers) at the reception timing of the frame. In particular, the wheel position detection is performed by determining whether variation of the obtained edge number (or tooth number) at the reception timing of the frame is within a predetermined range that is set based on the edge number (or the tooth number) at the previous reception timing.

In regard to a wheel 5a-5d to which a subject transmitter 2 transmitting the frame is integrated, the subject transmitter 2 transmits the frame each time the acceleration sensor 22 is at the predetermined angular position. Therefore, the tooth position of the gear 12a-12d corresponding to the wheel 5a-5d at the reception timing of the frame is substantially the same as the tooth position at the previous reception timing. As such, the variation of the edge numbers (or the tooth numbers) at the reception timings of the frame is small, and is within a predetermined range. Even if the frames are received at many times, the tooth positions at the reception timings of the frame are substantially the same, that is, within a predetermined range. The variation of the edge number (or the tooth number) at each reception timing of the frame is within a predetermined range set based on the edge number (or the tooth number) at the first reception timing of the frame.

On the other hand, in regard to different wheels 5a-5d to which the subject transmitter 2 is not integrated, the tooth positions at the reception timing of the frame transmitted from the subject transmitter 2 are different from the tooth position at the reception timing of the frame transmitted from the subject transmitter 2.

Namely, the gear 12a-12d of the wheel speed sensor 11a-11d rotates in association with the corresponding wheel 5a-5d. Therefore, with regard to the wheel 5a-5d to which the subject transmitter 2 is integrated, the tooth position at the reception timing of the frame transmitted from the subject transmitter 2 is substantially equal. In fact, the wheels 5a-5d have different rotating states due to a road condition, a turning, a lane changing and the like. Therefore, the rotating states of the wheels 5a-5d are not exactly the same. As such, the tooth position indicated by the edge number or the tooth number at the reception timing is different between the wheels 5a-5d.

As shown in FIG. 4, the edge number of each of gears 12a-12d is zero when the ignition switch (IG) is turned on, for example. After the vehicle begins to travel, the transmitters 2 transmit the frames. In this case, at the reception timing of the frame transmitted from the subject transmitter 2 integrated to the wheel, such as the wheel 5a, the tooth positions of the gears 12b-12d rotating in association with the wheels 5b-5d are different from the tooth position of the gear 12a rotating in association with the wheel 5a, as shown in the first through third timings in FIG. 4. Therefore, the wheel position is specified by determining whether a variation of the tooth position of the gear 12a-12d is within a predetermined range.

For example, as shown in FIG. 5A, it is assumed that the angular position of the subject transmitter 2 when the subject transmitter 2 transmits the frame first time is at a first reception angle. In this case, a variation allowance range VAR, which is an allowable range of the variation of the edge number (or the tooth number), is set at a range of 180 degrees centering on the first reception angle, that is, as a range of +/−90 degrees of the first reception angle. For example, the variation allowance range VAR set based on the edge number (or the tooth number) at the first reception timing is referred to as a first variation allowance range.

In regard to the edge number, the first variation allowance range VAR is set at a range of +/−24 of the edge number at the first reception timing. In regard to the tooth number, the first variation allowance range VAR is set at a range of +/−12 of the tooth number at the first reception timing.

Then, as shown in FIG. 5B, it is determined whether the edge number (or the tooth number) at the second reception timing of the frame is within the first variation allowance range VAR set by the edge number (or the tooth number) at the first reception timing of the frame. At the second reception timing of the frame, if the edge number (or the tooth number) of the gear 12a-12d is within the first variation allowance range VAR, there is a possibility that the wheel 5a-5d corresponding this gear 12a-12d is the wheel 5a-5d to which the subject transmitter 2 transmitting the frame is integrated. Thus, this determination result is indicated as "TRUE".

Further, a second variation allowance range is set based on the angular position of the transmitter 2 when the transmitter 2 transmits the frame second time. The angular position of the transmitter 2 when the transmitter 2 transmits the frame second time is referred to as a second reception angle. As shown in FIG. 5B, the second variation allowance range is set to a range of 180 degrees centering on the second reception angle. That is, the second variation allowance range VAR is set to a range of +/−90 degrees of the second reception angle.

Furthermore, a new variation allowance range VAR is set by an overlapping range where the first variation allowance range and the second variation allowance range overlap with each other, as a third variation allowance range. For example, the third variation allowance range is set to a range where the edge number is from 12 to 48, as shown in FIG. 5B. In this way, the variation allowance range VAR is reduced to the third variation allowance range.

As shown in FIG. 5C, it is determined whether the edge number (or the tooth number) at the third reception timing of the frame is within the third variation allowance range. If the edge number (or the tooth number) of the gear 12a-12d at the third reception timing of the frame is not within the third variation allowance range, the wheel 5a-5d corresponding this gear 12a-12d is not the wheel 5a-5d to which the subject transmitter 2 transmitting the frame is integrated. Thus, this determination result is indicated as "FALSE".

In this case, when the edge number (or the tooth number) at the third reception timing of the frame is outside of the third variation allowance range, even within the first variation allowance range, the determination result is indicated as "FALSE".

In this way, the microcomputer 33 determines to which wheel 5a-5d the subject transmitter 2 transmitting the frame is integrated.

As shown in FIG. 6A, each time the frame including first identification information ID1 as the identification information is received, the microcomputer 33 detects the edge numbers (or the tooth numbers) of the gears 12a-12d. The microcomputer 33 stores the edge numbers (or the tooth numbers) for respective wheels 5a-5d, such as a front left wheel FL, a front right wheel FR, a rear left wheel RL and a rear right wheel RR.

Further, each time the frame is received, the microcomputer 33 determines whether each of the detected edge numbers (or the tooth numbers) is within the variation allowance range. When the edge number is not within the variation allowance range, the microcomputer 33 excludes the corresponding wheel 5a-5d from candidate wheels 5a-5d to which the subject transmitter 2 is integrated until one wheel 5a-5d remains.

The microcomputer 33 registers the wheel 5a-5d remaining last as the wheel 5a-5d to which the subject transmitter 2 transmitting the frame is integrated. With regard to the first frame including the first identification information ID1, as shown in FIG. 6A, the front right wheel FR and the rear right wheel RR are excluded first, and then the rear left wheel RL is excluded. Thus, the front left wheel FL, which remains last, is registered as the wheel to which the subject transmitter 2 is integrated.

The microcomputer 33 performs the similar determination to the second to fourth frames including the first to fourth identification information ID2, ID3, ID4, as shown in FIGS. 6B to 6D. In this way, the wheel to which the subject transmitter 2 transmitting the frame is integrated is specified. As such, all the wheels having the transmitters 2 can be specified.

However, variation of the rectangular pulse wave indicated by the detection signal of the wheel speed sensors 11a-11d is likely to be large in a low speed region, such as 5 km/h or less. Therefore, the edge number (or the tooth number) will not be properly counted by the brake ECU 10. If the wheel position detection is performed based on such an inaccurate edge number (or the tooth number), the wheel position will not be accurately specified.

In the present embodiment, therefore, the TPMS-ECU 3 does not perform the wheel position detection when it is assumed that the wheel speed is in the low speed region, such as 5 km/h or less. In particular, the TPMS-ECU 3 detects the wheel speed based on the wheel speed information provided from the brake ECU 10. The TPMS-ECU 3 determines whether the wheel speed is equal to or lower than a wheel speed threshold defining the low speed region. The TPMS-ECU 3 determines that the wheel speed is in the low speed region when the wheel speed is equal to or lower than the wheel speed threshold.

Figure 7:
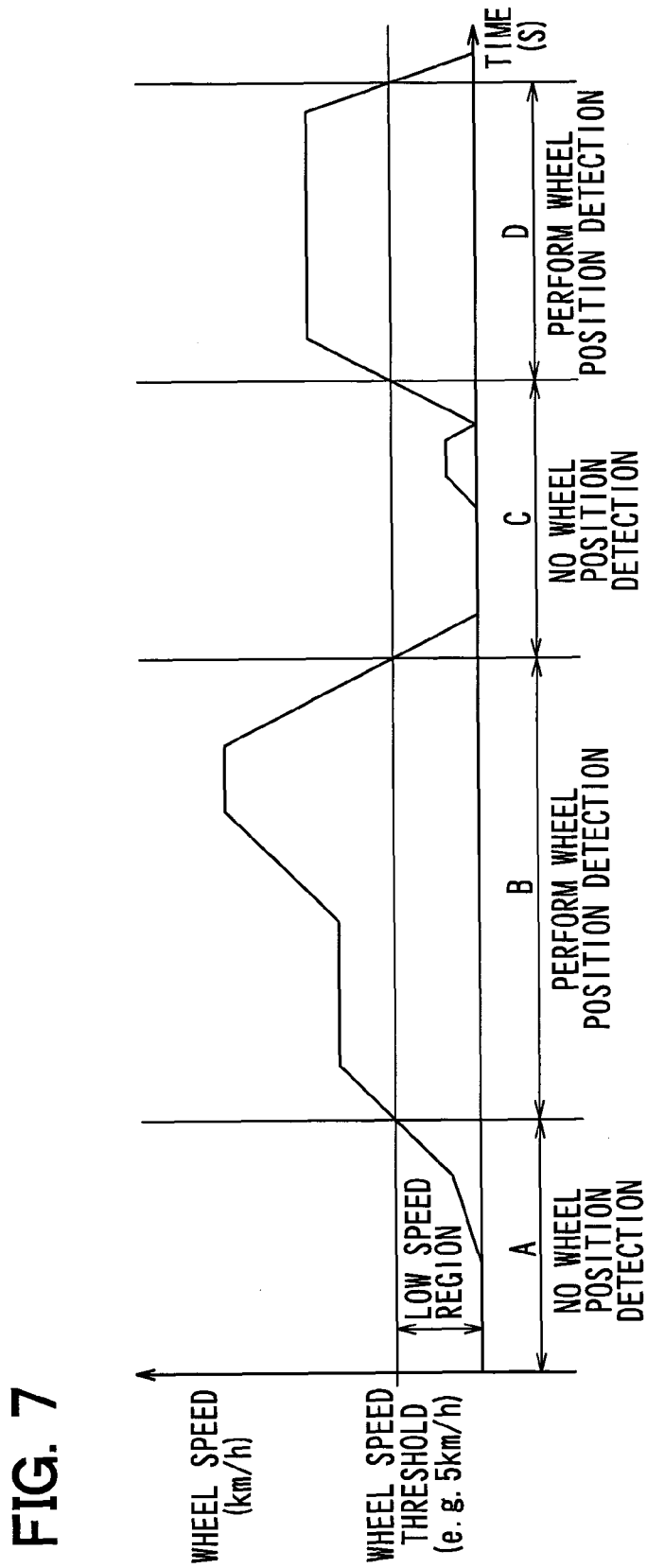
FIG. 7 is a time chart for illustrating an example of a change in wheel speed according to the first embodiment.

FIG. 7 is a time chart illustrating an example of a change of a wheel speed. In fact, the wheel speed is slightly different between the four wheels 5a-5d. However, in this description, it is assumed that the change of the wheel speed is the same for all the wheels 5a-5d for a purpose of easy understanding. FIGS. 8A to 8D illustrate wheel position evaluation results of the first to fourth frames respectively including the first to fourth identification information ID1, ID2, ID3, ID4 in a case where the wheel speed changes in a manner shown in FIG. 7.

The change of the wheel speed shown in FIG. 7 assumes a case where the vehicle 1 begins to travel from a stopped state by turning on an ignition switch, stops after the wheel speed reaches the low speed region during the wheel position detection, and travels again. In this case, in a period A from a time the vehicle 1 begins to travel to a time the wheel speed reaches the wheel speed threshold, the wheel position detection is not performed. In a period B from the time the wheel speed exceeds the wheel speed threshold, the wheel position detection is performed. In a period C where the wheel speed is reduced equal to or lower than the wheel speed threshold, the wheel position detection is not performed. In a period D where the wheel speed exceeds the wheel speed threshold again, the wheel position detection is performed.

In particular, in the period A, the wheel speed is equal to or lower than the wheel speed threshold. Therefore, the TPMS-ECU 3 does not perform the wheel position detection. In the present embodiment, the transmitter 2 begins to transmit the frame when the vehicle speed, which is detected based on the detection signal of the acceleration sensor 22, is equal to or greater than the predetermined speed, such as 3 km/h. Therefore, the frame is transmitted also in the period A. However, the TPMS-ECU 3 does not perform the wheel position detection even if the TPMS-ECU 3 receives the frame.

It may be possible to set a threshold of the vehicle speed to begin the frame transmission from the frame 2 equal to the wheel speed threshold defining the low speed region. However, there is a possibility that a difference occurs between the wheel speed detected by the brake ECU 10 and the vehicle speed detected by the transmitters 2. Therefore, it is preferable to set the wheel speed threshold of the vehicle speed to begin the frame transmission from the frame 2 lower than the threshold defining the low speed region.

In the period B, the TPMS-ECU 3 acquires the edge number (or the tooth number) of the gear at the reception timing of the frame each time the TPMS-ECU 3 receives the frame, for specifying the wheel position. As shown in FIGS. 8A to 8D, the TPMS-ECU 3 acquires the edge number (or the tooth number) at the reception timing of each of the first to fourth frames, and stores the relationship between the first to fourth frames and the wheels, such as the left front wheel FL, the right front wheel FR, the left rear wheel RL, and the right rear wheel RR. Further, each time the TPMS-ECU 3 receives the frame, the TPMS-ECU 3 determines whether the edge number (or the tooth number) acquired is within the variation allowance range. When the edge number (or the tooth number) is not within the variation allowance range, the TPMS-ECU 3 excludes the corresponding wheel from candidate wheel to which the subject transmitter 2 is integrated.

As shown in FIGS. 8B and 8D, for example, in the period B, it is specified that the transmitter 2 transmitting the second frame including the second identification information ID2 is integrated to the right front wheel FR. Also, it is specified that the transmitter 2 transmitting the fourth frame including the fourth identification information ID4 is integrated to the right rear wheel RR. In this case, however, the position of the transmitter 2 transmitting the first frame including the first identification information ID1 and the position of the transmitter 2 transmitting the third frame including the third identification information ID3 have not been specified yet, as shown in FIGS. 8A and 8C.

In the period C, the TPMS-ECU 3 interrupts the wheel position detection. In this case, the variation allowance range set in the previous period is cleared. That is, in the period C, the wheel speed is in the low speed range, the edge number (or the tooth number) provided from the brake ECU 10 will be inaccurate. Therefore, when the wheel speed is in the low speed region, the variation allowance range previously set is cleared.

With regard to the transmitter 2 transmitting the second frame including the second identification information ID2 and the transmitter 2 transmitting the fourth frame including the fourth identification information ID4, the wheel positions have been specified in the period B. Therefore, the TPMS-ECU 3 stores that the transmitter 2 transmitting the second frame is integrated to the right front wheel FR and the transmitter 2 transmitting the fourth frame is integrated to the right rear wheel RR.

In a case where the condition to transmit the frame from the transmitter 2 is set such that the vehicle speed is equal to or higher than the wheel speed threshold, such as 5 km/h or more, that defines the low speed region, the frame transmission is stopped when the vehicle speed is lower than the wheel speed threshold. In this case, the wheel position detection cannot be performed by the TPMS-ECU 3. However, the vehicle speed detected by each transmitter 2 will have an error. Therefore, there is a possibility that the frame is transmitted even if the actual vehicle speed is lower than the wheel speed threshold. As such, the frame transmission will be performed also in the period C.

In the period D, the wheel speed exceeds the wheel speed threshold again. Therefore, the wheel position detection is restarted. In this case, the wheel position detection is performed by newly setting the variation allowance range. Therefore, even if an inaccurate edge number (or tooth number) is provided from the brake ECU 10 due to the wheel speed being in the low speed region and/or even if the variation allowance range has been varied before the wheel speed reduces equal to or lower than the wheel speed threshold, since the variation allowance range is newly set, the wheel position is accurately specified.

In this case, as shown in FIGS. 8A to 8D, the wheel position detection is not performed again for the second frame including the second identification information ID2 and the fourth frame including the fourth identification information ID4, whose positions have been already specified. The wheel position detection is performed for the first frame including the first identification information ID1 and the third frame including the third identification information ID3, to which the wheel position detection have not been performed. With regard to the wheel that has been excluded from the candidate wheel before the interruption of the wheel position detection, the wheel is still excluded from the candidate wheel even after the wheel position detection is restarted. Therefore, the wheel position detection can be performed in a shorter time.

When the wheel position detection is performed for the first frame including the first identification information ID1 and the third frame including the third identification information ID3, as shown in FIGS. 8A and 8C, the first frame including the first identification information ID1 is specified as the frame transmitted from the transmitter 2 integrated to the left front wheel FL and the third frame including the third identification information ID3 is specified as the frame transmitted from the transmitter 2 integrated to the left rear wheel RL. Therefore, the wheel to which the subject transmitter 2 is integrated can be specified. Accordingly, all of the four wheels to which the transmitters 2 are integrated can be specified.

In this way, it is specified that to which of the wheels 5a-5d the transmitter 2 transmitting the frame is integrated. Then, the microcomputer 33 stores the relationship between the identification information of each transmitter 2 and the position of the corresponding wheel 5a-5d to which the transmitter 2 is integrated.

After the wheel position detection is performed in the manner described above, the tire pressure detection is performed. When the tire pressure detection is performed, the frame is transmitted from each of the transmitters 2 at a predetermined interval. The TPMS-ECU 3 receives the frames from all the transmitters 2 each time the transmitters 2 transmit the frames.

The TPMS-ECU 3 determines from which transmitter 2 each of the frames is transmitted based on the identification information stored in the frame, and detects the tire pressure from the information regarding the tire pressure stored in the frame. Thus, the TPMS-ECU 3 determines whether the tire pressure of any of wheels 5a-5d is decreased, and specifies the wheel 5a-5d whose tire pressure is decreased. When the TPMS-ECU 3 detects the decrease in tire pressure of any of the wheels 5a-5d, the TPMS-ECU 3 notifies the meter 4 of the detection result. Thus, the meter 4 displays the decrease in the tire pressure with the indication of the wheel 5a-5d to notify the driver.

As described above, the wheel position detection is not performed in the low speed region. Therefore, it is less likely that the wheel position detection will be performed based on an inaccurate tooth position. As such, the wheel position is accurately specified.

The wheel position detection is interrupted when the wheel speed decreases equal to or lower than the wheel speed threshold, which defines the low speed region, during the wheel position detection, and is restarted when the wheel speed exceeds the wheel speed threshold. When the wheel position detection is restarted, the variation allowance range, which was set in the previous wheel position detection, is cleared, and is newly set. Therefore, the wheel position is accurately specified even if an inaccurate edge number (or tooth number) is provided from the brake ECU 10 due to the wheel speed being decreased equal to or lower than the wheel speed threshold and/of even if the variation allowance range is varied before the wheel speed is decreased equal to or lower than the wheel speed threshold.

When the wheel position detection is restarted, the wheel position detection is not performed for the frame the position of the transmitter 2 of which has been already specified. Namely, the wheel position detection is performed only for the frame the position of the transmitter 2 of which has not been specified yet. Accordingly, the wheel position can be specified in a further shorter time.

The TPMS-ECU 3 acquires the gear information at a predetermined interval. The TPMS-ECU 3 sets the variation allowance range based on the tooth position at the reception timing of the frame. Further, the TPMS-ECU 3 determines whether the tooth position at a subsequent reception timing of the frame is within the set variation allowance range. When the tooth position at the subsequent reception timing of the frame is not within the set variation allowance range, the corresponding wheel is excluded from the candidate wheel until one wheel remains. Then, the TPMS-ECU 3 stores the wheel remaining last as the wheel to which the subject transmitter 2 is integrated. Therefore, the wheel position is specified without requiring a large amount of data.

Further, an overlapping range where the variation allowance range set based on the reception timing of the frame and the variation allowance range set based on the previous reception timing of the frame overlap with each other is set as a new variation allowance range. Therefore, the variation allowance range is reduced. Accordingly, the wheel position is specified further accurately in a shorter time.

The frame transmission is performed when the vehicle speed exceeds the predetermined speed, and the position of the transmitter 2 within the wheel 5a-5d is detected using the acceleration sensor 22. Therefore, although the wheel position detection is performed only after the vehicle 1 begins to travel, the wheel position detection is performed immediately after the vehicle 1 begins to travel. Further, the wheel position can be specified without requiring a trigger device, differently from the case where the wheel position is identified based on an intensity of a signal outputted from a trigger device.

Second Embodiment

A second embodiment of the present disclosure will be hereinafter described. In the second embodiment, a way of transmitting the frame from the transmitter 2 is different from that of the first embodiment. Other features are the same as the first embodiment. Therefore, the feature different from the first embodiment will be mainly described.

In the first embodiment, the transmitter 2 transmits the frame each time the acceleration sensor 22 is at a certain angular position. That is, the transmission angular position of the transmitter 2 is fixed. In the present embodiment, on the other hand, the transmission angular position is changed each time that the vehicle 1 stops.

In a case where the transmission angular position of the transmitter 2 is fixed, if the transmission angular position coincides with a position where the frame is less likely to reach the TPMS-ECU 3, such as a Null, it will be difficult that the TPMS-ECU 3 receives the frame every time the frame is transmitted. In the case where the transmission angular position is changed each time the vehicle 1 stops, even if the TPMS-ECU 3 previously fails to receive the frame due to the frame being transmitted from the position of the Null, the frame is transmitted from a position different from the Null when the vehicle 1 stops and begins to travel again. Therefore, the TPMS-ECU 3 properly receives the frame.

Accordingly, the wheel position detection is further accurately performed. Further, the wheel position is specified in a further shorter time.

For example, the transmitter 2 may detect that the vehicle 1 stops traveling based on the gravitational acceleration component contained in the detection signal of the acceleration sensor 22.

Other Embodiments

In the embodiments described above, the variation allowance range is changed each time the frame is received such that the variation allowance range is gradually reduced. However, the variation allowance range that is set centering on the tooth position is fixed. The variation allowance range that is set centering on the tooth position may be also changed. For example, the variation of the tooth position is likely to increase with an increase in vehicle speed. Therefore, in a case where the variation allowance range is increased with the increase in vehicle speed, the variation allowance range may be further accurately set. Also, accuracy of detecting the timing where the angular position of the acceleration sensor is at the predetermined angular position is likely to reduce with an increase in sampling interval of detecting the acceleration by the acceleration sensor 22. Therefore, the variation allowance range may be changed in accordance with the sampling interval.

In such a case, the variation allowance range is further accurately set. Since the transmitter 2 realizes the sampling interval and the like, the transmitter 2 may include data for determining the magnitude of the variation allowance range in the frame.

In the embodiment described above, the angular position right above the wheel center axis is defined as the zero position, as the reference position. However, the reference position may be set to any position in a circumferential direction of the wheel 5a-5d.

In the embodiments described above, the TPMS-ECU 3 acquires the gear information from the brake ECU 10. However, the TPMS-ECU 3 may acquire the edge number or the tooth number as the gear information in any other way. For example, the TPMS-ECU 3 may acquire the edge number or the tooth number as the gear information from another ECU. As another example, the TPMS-ECU 30 may receive the detection signals from the wheel speed sensors 11a-11d, and obtain the edge number or the tooth number of each gear 12a-12d based on the detection signal obtained.

In the embodiments described above, the TPMS-ECU 3 and the brake ECU 10 are separate. As another example, the TPMS-ECU 3 and the brake ECU 10 may be integrated into a single ECU. That is, the TPMS-ECU 3 and the brake ECU 10 may be provided by a single ECU. In such a case, the ECU may directly receive the detection signals of the wheel speed sensors 11a-11d, and obtain the edge number or the tooth number of each gear 12a-12d based on the detection signal received.

In this case, the ECU may continuously obtain the edge numbers or the tooth numbers. Therefore, the wheel position detection is performed based on the gear information at an exact reception timing of the frame, differently from the case where the gear information is received at the predetermined interval.

In the embodiment described above, the wheel position detection device is exemplarily employed to the vehicle 1 having four wheels 5a-5d. The wheel position detection device may be employed to a vehicle having wheels other than four.

In the embodiment described above, when the wheel position is specified based on the gear information, the variation allowance range is set based on the tooth position, and the wheel position is specified by determining whether the tooth position is within the variation allowance range. Further, the variation allowance range is reduced by setting the overlapping range where the previous variation allowance range and the subsequent variation allowance range overlap with each other as the new variation allowance range. In this case, the wheel position is specified in the shorter time.

However, even if the variation allowance range is not reduced, since the accurate gear position is acquired as described above, the wheel position is specified further accurately in a further shorter time.

For example, the transmission angular position of the transmitter 2 may be changed each time the transmitter 2 transmits the frame. In such a case, the microcomputer 33 corrects the tooth position of the gear 12a-12d detected at the reception timing associated with the frame that is transmitted at a transmission angular position changed by the microcomputer 23 of the transmitter 2 to a tooth position associated with a frame that is transmitted at a fixed transmission angular position. The microcomputer 33 of the TPMS-ECU 3 determines whether the tooth position of the gear 12a-12d corrected is within the variation allowance range in the wheel position detection.

In the present disclosure, the wheel speed sensors 11a-11d detect at least the passage of the teeth of the gears 12a-12d rotated in association with the wheels 5a-5d. The gears 12a-12d may have a structure in which teeth have conductive outer surfaces and intermediate portions between the teeth have a magnetic resistance different from the outer surfaces of the teeth. Namely, the gears 12a-12d may have any structure. For example, the gears 12a-12d may be a general gear having projections and recesses on an outer surface of the gear. The projections have conductivity, and the recesses are spaces providing non-conductive portions. As another example, the gears 12a-12d may be a rotor switch whose outer surface includes conductive portions and non-conductive insulation portions, as described in JP-A-10-048233.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:
1. A wheel position detecting device for a vehicle having a vehicle body and a plurality of wheels, the wheel position detecting device comprising:
    a transmitter being integrated to each of the plurality of wheels, the transmitter including a first control unit, the first control unit generating and transmitting a frame including identification information specific to the transmitter; and a receiver being integrated to the vehicle body, the receiver including an antenna and a second control unit, the second control unit receiving the frame transmitted from the transmitter through the antenna, the second control unit performing a wheel position detection to specify which of the plurality of wheels the transmitter transmitting the frame is integrated to and to store a relationship between the identification information of the transmitter and the wheel to which the transmitter is integrated, wherein the transmitter includes an acceleration sensor that outputs a detection signal according to an acceleration containing a gravitational acceleration component that varies with rotation of the wheel to which the transmitter is integrated, the first control unit-detects an angular position of the transmitter relative to a reference position, based on the gravitational acceleration component provided by the detection signal of the acceleration sensor, the reference position being set at any position in a circumferential direction of the wheel to which the transmitter is integrated, and the first control unit transmits the frame when the transmitter is at a transmission angular position, the wheel position detecting device further comprising:

a wheel speed sensor being provided for each of the wheels to detect a tooth of a gear that rotates in association with a corresponding wheel, the gear including conductive portions as teeth and intermediate portions between the conductive potions, the intermediate portions having a magnetic resistance different from the conductive portions, wherein the second control unit acquires gear information indicating a tooth position of the gear based on a detection signal of the wheel speed sensor, in the wheel position detection, the second control unit sets a variation allowance range based on the tooth position at a reception timing of the frame and determines whether the tooth position at a subsequent reception timing of the frame is within the variation allowance range, and when the tooth position of the gear at the subsequent reception timing is not within the variation allowance range, the second control unit excludes the wheel corresponding to the gear a from a candidate wheel until one wheel remains, and registers a remaining wheel as the wheel to which the transmitter is integrated, and the second control unit prevents the wheel position detection when a wheel speed detected based on a detection signal of the wheel speed sensor is equal to or lower than a predetermined threshold, and performs the wheel position detection only when the wheel speed is higher than the predetermined threshold.

2. The wheel position detecting device according to claim 1, wherein the second control unit stops the wheel position detection when the wheel speed reduces equal to or lower than the predetermined threshold during the wheel position detection, and restarts the wheel position detection when the wheel speed exceeds the predetermined threshold, and when the second control unit restarts the wheel position detection, the second control unit clears the variation allowance range that is set before the wheel position detection is stopped, and newly sets the variation allowance range.

3. The wheel position detecting device according to claim 2, wherein when the second control unit restarts the wheel position detection, the second control unit does not perform the wheel position detection for a frame including identification information corresponding to the wheel that has been registered as the wheel to which the transmitter transmitting the frame is integrated, and performs the wheel position detection with regard to a frame including identification information corresponding to the wheel that has not been registered.

4. The wheel position detecting device according to claim 3, wherein when the second control unit restarts the wheel position detection and performs the wheel position detection for the frame including the identification information corresponding to the wheel that has not been registered, the second control unit performs the wheel position detection while excluding the wheel that has been excluded from the candidate wheel in a previous wheel position detection performed before the wheel position detection is stopped.

5. The wheel position detecting device according to claim 1, wherein the transmitter detects that the vehicle stops traveling based on the gravitational acceleration component contained in the detection signal of the acceleration sensor, and when the vehicle stops traveling, the transmitter changes the transmission angular position.

6. The wheel position detecting device according to claim 1, wherein the second control unit changes the variation allowance range each time the frame is received, the second control unit sets an overlapping range between the variation allowance range and a previous variation allowance range set based on the tooth position of the gear at a previous reception timing of the frame, as a new variation allowance range, the second control unit corrects the tooth position of the gear detected at the reception timing associated with the frame that is transmitted at a transmission angular position changed by the first control unit to a tooth position associated with a frame that is transmitted at a fixed transmission angular position, and the second control unit determines whether the tooth position of the gear corrected is within the variation allowance range, to specify the wheel to which the transmitter is integrated.

7. The wheel position detecting device according to claim 1, wherein the second control unit increases the variation allowance range with an increase in a vehicle speed.

8. The wheel position detecting device according to claim 1, wherein the first control unit generates the frame including data for determining a magnitude of the variation allowance range set by the second control unit.

9. A tire pressure detecting apparatus comprising:

the wheel position detecting device according to claim 1, wherein the transmitter includes a sensing unit that outputs a detection signal according to a tire pressure of the corresponding wheel, the first control unit generates tire pressure information indicating the detection signal of the sensing unit,
the first control unit stores the tire pressure information in the frame, and transmits the frame, and
the second control unit detects the tire pressure of each wheel based on the tire pressure information stored in the frame.

* * * * *